_United States Patent Office_  2,996,500
Patented Aug. 15, 1961

2,996,500
DIAZOACETYLSERINE COMPOUNDS AND METHODS FOR PRODUCING THE SAME
John Ehrlich, Grosse Pointe Park, Mildred Penner Knudsen, Birmingham, Quentin R. Bartz, Detroit, Salvatore A. Fusari, St. Clair Shores, and Theodore H. Haskell, Clawson, Mich., and James A. Moore, Newark, Del., assignors to Parke, Davis & Company, Detroit, Mich., a corporation of Michigan
No Drawing. Filed June 6, 1956, Ser. No. 589,597
11 Claims.  (Cl. 260—239)

This application is a continuation-in-part of copending application Serial No. 331,308, filed January 14, 1953, now abandoned, which is a continuation-in-part of Serial No. 267,698, filed January 22, 1952, now abandoned.

The invention relates to new chemical compounds and to methods for producing the same. The compounds are the O-diazoacetylserines in carboxylic acid form and the metal salts thereof. The generic structural formula is,

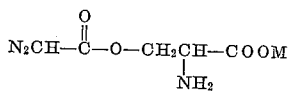

where M is H or a metal.

The new compounds may be obtained as unresolved racemic mixtures [(dl)-form] or may be obtained as the separate (l)- or (d)-optical isomers. The carboxylic acid compound herein referred to as O-diazoacetyl-(l)-serine and having the formula,

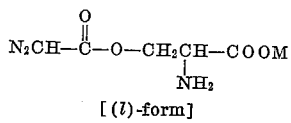

has been given the name, azaserine.

The acid forms of the compounds of this invention are relatively unstable to heat, and decompose before melting. The decomposition does not occur at any specific temperature and consequently the decomposition and melting points vary over a wide range depending upon the method used in their determination. Using a Fisher-Johns melting point apparatus, with the temperature being raised at the rate of 1° C. per minute a sample applied to the stage near the melting point behaves as follows:

|  | ° C. |
|---|---|
| Starts browning | 150–152 |
| Sinters and effervesces | 155 |
| A clear melt with some slight effervescence | 158–159 |

When using a copper block raising the temperature 1° C. per minute with the sample enclosed in a sealed capillary tube the results obtained are usually about as follows:

|  | ° C. |
|---|---|
| Starts sintering | 146 |
| Starts browning | 150 |
| Completely brown | 154 |
| Vigorous decomposition with gas evolution | 158 |
| A clear melt with some slight effervescence | 162 |

O-diazoacetyl-(l)-serine and O-diazoacetyl-(dl)-serine are decomposed by aqueous acid with the liberation of 16.18% nitrogen. Under very mild acid hydrolysis these compounds yield nitrogen and the corresponding O-glycolyl serine. More vigorous acid hydrolysis of these compounds produces nitrogen, glycollic acid and the corresponding serine.

The acid compounds are very soluble in water but insoluble in the common non-polar organic solvents. They are only very slightly soluble in absolute methanol, absolute ethanol and acetone in the cold but are soluble in warm aqueous solutions of these solvents. The optically active isomers of the acid compounds have very little optical rotatory power. An 8.46% solution of the (l)-isomer in water at pH 5.18 shows a specific rotation $[\alpha]_D^{27.5}$ of $-0.5°$.

The O-diazoacetylserines form metal salts upon reaction with alkali metal or alkaline earth metal hydroxides, carbonates, bicarbonates, oxides, alkoxides, amides and the like.

The products of the invention, the O-diazoacetylserines, possess significant fungicidal properties and hence are useful agents for the control of fungus diseases. In particular, these compounds are especially well adapted as fungicidal ingredients of compositions employed for combatting or controlling the plant disease caused by *Alternaria solani*, commonly known and recognized as "tomato early blight." For this purpose, a dilute aqueous solution is employed and the solution uniformly applied to the leaf surfaces, stem, branches, etc., of the growing plant in accordance with methods known in the art. The compounds are effective in high dilution, as is illustrated by the fact that O-diazoacetyl-(l)-serine, in aqueous solution at a concentration of 0.015 pounds per 100 gallons of ultimate mixture, provides 88% control of the mentioned disease caused by *Alternaria solani*. Higher concentrations afford even greater control.

The ultraviolet absorption spectra of O-diazoacetyl-(l)-serine and O-diazoacetyl-(dl)-serine are identical. In aqueous phosphate buffer at pH 7 a characteristic absorption peak is obtained at a wave-length of 250.5 millimicrons $(E_{1\,cm.}^{1\%}.\ 1140)$ In 0.1 normal sodium hydroxide solution after thirty minutes an absorption peak is observed at a wave-length of 252 millimicrons $(E_{1\,cm.}^{1\%}.\ 1230)$ In 0.1 normal hydrochloric acid little or no absorption is observed. This is probably due to the decomposition of these products under acidic conditions.

O-diazo-(l)-serine and O-diazoacetyl-(dl)-serine differ in their crystal forms. O-Diazoacetyl-(l)-serine is a light yellow-greenish crystalline solid while O-diazoacetyl-(dl)-serine is a pale yellow crystalline solid under normal light. Under plane polarized light the latter product is a colorless crystalline solid.

The crystals of O-diazoacetyl-(l)-serine are biaxially positive with a moderately high birefringence. Extinction is parallel on elongated cleavage fragments and crystals. The compound probably crystallizes in the orthohombic system. Cleavage fragments and crystals are length fast, are elongated parallel to the β vibration and have an excellent plate cleavage parallel to the α—β plane. Since the crystals tend to lie on this flat surface only two of their indices can be measured. Measurement of these two indices (the α and β) gives the following values:

$$\alpha = 1.523 \pm 0.002$$
$$\beta = 1.607 \pm 0.002$$

The crystals of O-diazoacetyl-(dl)-serine are biaxially positive, the 2V is large and birefringence is extreme so that even very thin fragments give a high order of white color under crossed Nicol prisms. Since certain faces of these crystals are so developed that the crystals lie on these faces and give a preferred orientation, a large majority of the crystals give slightly to moderately off-center optic axis figures. The crystals belong to either the monoclinic or the triclinic system. The measured indices, using sodium light (wave-length, 5830 Angstrom units) are:

$$\alpha = 1.470 \pm 0.005$$
$$\beta = 1.564 \pm 0.002$$
$$\gamma = 1.744 \pm 0.006$$

Since the crystal structures of O-diazoacetyl-($l$)-serine and O-diazoacetyl-($dl$)-serine are different their infrared absorption spectra also differ.

The infrared absorption spectrum of O-diazoacetyl-($l$)-serine determined using a mineral oil mull composed of the ground crystalline material and a mineral oil known commonly as Nujol shows the following absorption peaks: 3.19, 3.81, 4.66, 5.89, 5.96, 6.22, 6.45, 6.63, 6.90, 7.15, 7.41, 7.57, 7.68, 7.85, 8.08, 8.42, 8.61, 9.12, 9.70, 10.16, 10.32, 10.82, 11.16, 11.66, 11.83, 12.14, 13.26, 13.46, 13.60 and 13.78 microns.

The infrared absorption spectrum of O-diazoacetyl-($dl$)-serine determined by the method mentioned above for the ($l$)-optical isomer shows absorption peaks at the following values: 3.20, 3.68, 3.88, 3.99, 4.11, 4.68, 5.94, 6.26, 6.42, 6.68, 7.16, 7.38, 7.48, 7.64, 7.95, 8.44, 8.72, 9.14, 9.48, 9.88, 10.62, 10.87, 11.94, 12.30, 13.52, 13.86 and 14.67 microns.

In accordance with the invention, the O-diazoacetyl-serines are produced synthetically by reacting the corresponding O-glycylserines with a diazotizing agent. In carrying out this conversion, an acid addition salt of the O-glycylserine compound is used as the starting material and the temperature of the reaction mixture kept below about 30° C. The pH of the reaction mixture should be carefully controlled in the range of 3.0 to 6.0 during the process in order to obtain satisfactory yields of the desired products. Best results are obtained when the pH of the reaction mixture is kept between 4.0 and 5.5. At a pH greater than about 6 the O-glycylserine starting materials undergo rearrangement to the corresponding N-glycyl-serine thus materially reducing the yield of the desired product. At a pH below about 3.0 the desired O-diazoacetyl serines undergo decomposition which also lowers the yield and results in contamination of the final product. As a reaction medium water or aqueous solutions of water-miscible organic solvents such as alcohols are preferred.

In carrying out the diazotization reaction a number of different diazotizing agents can be used. For example, nitrous acid, alkyl nitrites, and nitrosyl compounds can be used. When employing nitrous acid as the diazotizing agent one can use a solution of nitrous acid (prepared by the reaction of nitrogen trioxide with water) or the nitrous acid can be generated in situ by the interaction of a mineral acid and an inorganic nitrite such as the alkali metal nitrites, alkaline earth metal nitrites and heavy metal nitrites. Some specific examples of such inorganic nitrites are sodium nitrite, potassium nitrite, barium nitrite, silver nitrite and the like. Since the O-glycyl serine compound used as the starting material is in the form of an acid addition salt it is usually preferable not to add a mineral acid to the reaction mixture but to merely allow the acid addition salt to react with the inorganic nitrite to produce the nitrous acid in situ. The nitrous acid can also be produced in situ by bubbling nitrogen trioxide through the aqueous reaction mixture or by utilizing the nitric acid salt of the O-glycyl serine and adding a reducing substance such as arsenious acid to the reaction mixture. Some examples of the alkyl nitrites which can be used as diazotizing agents are ethyl nitrite, butyl nitrite and amyl nitrite. Some examples of the nitrosyl compounds which can be used in the process are nitrosyl chloride, nitrosyl bromide and nitrosyl sulfuric acid. The quantity of diazotizing agent used in the process is not particularly critical but for reasons of economy at least one equivalent should be used for each equivalent of the O-glycyl serine starting material. Best results are obtained when an excess of the diazotizing agent is used and even though it is desired to diazotize only one of the two amino groups present in the O-glycyl serine starting material as much as three to four equivalents of the diazotizing agent can be used without deleterious effect upon the yield of the desired product.

The transformation involved in the above-described diazotization reaction can be represented graphically as follows:

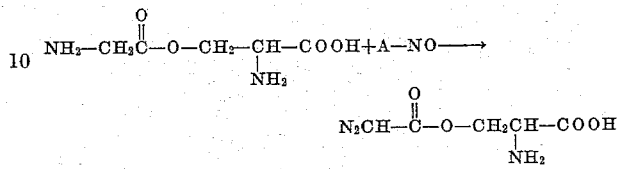

where A represents HO—, alkyl-O-, —SO$_4$H or halogen.

The starting materials for the process, as hereinabove set forth, namely the O-glycylserine compounds, are new compositions of matter. They can be prepared by various methods, some of which are described and claimed in the copending application Serial No. 565,522, filed January 26, 1956, as a division of Serial No. 331,308.

In one method for producing the O-glycylserine acid addition salts N-carbobenzoxy serine is reacted with carbobenzoxyglycine ethyl carbonate to produce O-(N-carbobenzoxyglycyl)-N-carbobenzoxyserine, and the latter is reduced under acidic conditions to the corresponding acid addition salt of O-glycylserine using gaseous hydrogen under pressure in the presence of a hydrogenation catalyst.

The invention is illustrated by the following examples.

*Example 1*

2.6 g. of sodium nitrate dissolved in 25 cc. of water is added to a solution of 2.9 g. of O-glycyl-($l$)-serine monohydrochloride in 200 cc. of water keeping the temperature at 0° C. The solution is allowed to stand at 0–5° C. for one-half hour and then at room temperature (20 to 30° C.) for five hours. The solution is frozen and the ice sublimed from the frozen mixture under high vacuum. The tan solid so obtained is dissolved in 40 cc. of water and poured into an adsorption column containing 40 g. of activated carbon (Darco) and 40 g. of diatomaceous earth (Celite). The adsorption column is washed with water until the effluent measures approximately 400 cc. The effluent is discarded and the column washed with approximately 200 cc. of an aqueous solution containing 2% acetone. The aqueous acetone eluate is collected and evaporated to dryness in vacuo. The product thus obtained is O-diazoacetyl-($l$)-serine. It is chemically pure but, if desired, it can be recrystallized from a mixture composed of pyridine, water and ethanol.

The opposite optical isomer, O-diazoacetyl-($d$)-serine, can be obtained in accordance with the foregoing method by employing O-glycyl-($d$)-serine monohydrochloride instead of the corresponding ($l$)-isomer.

*Example 2*

863 mg. of sodium nitrite dissolved in 20 cc. of water is added to a solution of 990 mg. of O-glycyl-($dl$)-serine monohydrochloride in 30 cc. of water keeping the temperature at about 0° C. The solution is allowed to stand for thirty minutes at 0 to 5° C., frozen and the ice sublimed from the frozen mass under high vacuum. The solid residue is dissolved in 10 cc. of water and the solution poured through an adsorption column containing 10 g. of activated carbon and 10 g. of diatomaceous earth. The column is washed with water until approximately 120 cc. of effluent has been collected. The effluent is discarded and water containing 2% acetone passed through the column until the effluent becomes colorless. The aqueous acetone eluate is frozen and the ice sublimed from the frozen mass under high vacuum. The product thus obtained is O-diazoacetyl-($dl$)-serine and, if desired it is purified by recrystallization from pyridine-water-ethanol mixture.

Example 3

6.8 g. of silver nitrite is added with stirring to a solution of 8.8 g. of O-glycyl-(*dl*)-serine monohydrochloride in 440 cc. of water. The solution is stirred at room temperature (about 25° C.) for four minutes and then the silver chloride removed by filtration. The filtrate is frozen, the ice sublimed from the frozen mass under high vacuum and the residue dissolved in 100 cc. of water. The solution is poured through an adsorption column containing 100 g. of activated carbon and 100 g. of diatomaceous earth and the column washed with water until the volume of the effluent is approximately 1.2 liters. The effluent is discarded and water containing 3% acetone poured through the adsorption column until the aqueous acetone effluent becomes colorless. The aqueous acetone effluent is frozen and the ice sublimed from the frozen mass under high vacuum. The residue is recrystallized from pyridine-water-ethanol mixture to obtain O-diazoacetyl-(*dl*)-serine in pure form like the product obtained in accordance with Example 2.

Example 4

Approximately 20 cc. of a cold standardized aqueous solution containing 1 g. of nitrous acid is added with stirring to a solution of 1 g. of O-glycyl-(*dl*)-serine monohydrochloride in 50 cc. of water keeping the temperature at 0° C. The pH of the solution is adjusted during the addition so that it remains in the range of 4 to 5.5. The reaction mixture is allowed to stand at 5° C. for four hours. The solution is frozen, the ice sublimed from the frozen mass under reduced pressure and the residue dissolved in 25 to 30 cc. of water. The solution is poured through an adsorption column containing 25 g. of activated carbon and 25 g. of diatomaceous earth and the column washed with water until the volume of the effluent is approximately 250 cc. The effluent is discarded and the column washed with water containing 3% acetone until the aqueous acetone effluent is colorless. The aqueous effluent is frozen and the ice sublimed from the frozen mass under high vacuum to obtain a pale yellow-greenish solid which can be recrystallized from pyridine-water-ethanol mixture. This product is O-diazoacetyl-(*dl*)-serine.

Example 5

1 g. of amyl nitrite in 15 cc. of ethanol is added to a solution of 1 g. of O-glycyl-(*l*)-serine monohydrochloride in 50 cc. of water keeping the temperature near 0° C. The pH of the solution is adjusted to between 4 and 5.5 with dilute sodium hydroxide solution and the reaction mixture stirred for four hours at 5° C. The solution is frozen and the ice sublimed from the frozen mass under high vacuum. The residue is dissolved in 25 cc. of water and the solution poured through an adsorption column containing 25 g. of diatomaceous earth and 25 g. of activated carbon. The column is washed with water until the volume of the effluent is approximately 250 cc. and then this effluent discarded. The column is washed with water containing 2% acetone until the effluent is colorless and the effluent is frozen. The ice is sublimed from the frozen mass under high vacuum to obtain a pale yellow-greenish crystalline solid which is purified by recrystallization from pyridine-water-ethanol mixture;

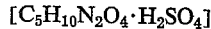 = approximately 1140 at 250.5 millimicrons at pH 7. This product is O-diazoacetyl-(*l*)-serine.

Example 6

2 g. of crude O-glycyl-(*dl*)-serine disulfate $$[C_5H_{10}N_2O_4 \cdot H_2SO_4]$$

is dissolved in 50 cc. of water and the pH of the solution adjusted to 5 using 5% sodium hydroxide solution. The O-glycyl-(*dl*)-serine disulfate is converted to the monosulfate salt by this procedure. The volume of the solution is adjusted to 70 cc.; and the solution cooled to 0–5° C. A cold solution of 1.17 g. of sodium nitrite in 130 cc. of water is added in portions with stirring keeping the temperature in the neighborhood of 0° C. The reaction mixture is allowed to stand at 0 to 5° C. for thirty minutes and then at room temperature (25° C.) for four and one-half hours. The solution is frozen and the ice sublimed from the frozen mass under high vacuum. The residue is dissolved in 15 cc. of water and the solution poured through an adsorption column containing 11 g. of activated carbon and 11 g. of diatomaceous earth. The column is washed with water until the volume of the effluent is approximately 120 cc. The effluent is discarded and the column washed with water containing 2% of acetone until the eluate is colorless. The aqueous acetone eluate is evaporated to dryness in vacuo and the residual O-diazoacetyl-(dl)-serine purified by recrystallization from ethanol-water mixture.

By substituting O-glycyl-(*l*)-serine monosulfate or O-glycyl-(*d*)-serine monosulfate $[(C_5H_{10}N_2O_4)_2 \cdot H_2SO_4]$ for the O-glycyl-(*dl*)-serine disulfate in the above procedure one obtains O-diazoacetyl-(*l*)-serine or O-diazoacetyl-(*d*)-serine respectively.

Example 7

3.5 g. of butyl nitrite in 25 cc. of cold ethanol is added with stirring to a solution of 3.5 g. of O-glycyl-(*l*)-serine monohydrochloride in 100 cc. of water keeping the temperature at 0° C. The pH of the solution is adjusted to 3.5 and the solution allowed to stand for four hours at room temperature. During this time the pH of the solution is kept between 4.0 and 5.5. The reaction mixture is frozen and the ice sublimed from the frozen mass under high vacuum. The residue is dissolved in 40 cc. of water and the solution poured through an adsorption column containing 40 g. of activated carbon and 40 g. of diatomaceous earth. The column is washed with water until the volume of the effluent is approximately 400 cc. and the effluent discarded. The column is then washed with 200 cc. of water containing 3% of acetone and the aqueous acetone eluate evaporated to dryness in vacuo to obtain the desired O-diazoacetyl-(*l*)-serine.

Example 8

A solution consisting of 2.2 g. of O-glycyl-(*l*)-serine monohydrochloride in 100 cc. of water is cooled to 0° C. and nitrogen trioxide fumes bubbled into the solution until a large excess of nitrous acid, as indicated by starch iodide paper, is present. The solution is allowed to warm to room temperature and allowed to stand at this temperature for five hours. The pH during this time is maintained between 3.5 and 5.0 and more nitrogen trioxide added if a starch-iodide test proves negative. The pH of the solution is adjusted to 6, the solution frozen and the ice sublimed from the frozen mass under high vacuum. The residue is dissolved in 40 cc. of water and the solution passed through an adsorption column containing 40 g. of activated carbon and 40 g. of diatomaceous earth. The column is washed with water until the volume of the eluate is about 250 cc. and this eluate discarded. The column is washed with water containing 2% of acetone until the eluate becomes colorless and the eluate evaporated to dryness in vacuo. The residue which consists of O-diazoacetyl-(*l*)-serine is purified by recrystallization from pyridine-water-ethanol mixture.

Instead of using the monohydrochloride and monosulfate salts in the above procedures one can also use other acid addition salts of the O-glycyl serines. For example, the monohydrobromide, monohydrofluoride, monophosphate and the like mono salts can be used. The disalts of the O-glycyl serines, that is, the products in which both of the amino groups are in salt form, cannot be employed in the process due to the limited pH range within which the diazotization reaction must be carried out. Thus if a di-salt is employed as the starting material it is neutralized to the mono-salt in situ when the pH of the diazotization reaction mixture is adjusted. The term "mono-" and "di-" as used herein in chemical nomenclature refer to the number of amino groups in salt form. Thus the compound $(C_5H_{10}N_2O_4)_2 \cdot H_2SO_4$ is termed a monosulfate while the compound $C_5H_{10}N_2O_4 \cdot H_2SO_4$ is termed a disulfate.

The above procedures describe the method used to isolate the O-diazoacetylserines in the form of the free acids. These compounds can also be isolated in the form of their alkali metal and alkaline earth metal salts by modifying the above procedures slightly. This is accomplished by adding an aqueous solution containing one equivalent of an alkali or alkaline earth metal hydroxide, bicarbonate or carbonate to the aqueous acetone eluate before freeze drying of the same. The salts obtained in this manner are white, water-soluble powders. These salts can also be obtained by dissolving some of the pure acid in water and adding an equivalent amount of one of the aforementioned alkaline substances. For example, the sodium, potassium and calcium salts can be obtained in the following manner.

1.7 g. of O-diazoacetyl-(l)-serine is dissolved in 30 cc. of water and an aqueous solution containing 0.84 g. of sodium bicarbonate added. The clear solution is frozen and the ice sublimed from the frozen mass under high vacuum to obtain the desired sodium salt of O-diazoacetyl-(l)-serine as a white powder.

1.7 g. of O-diazoacetyl-(dl)-serine is dissolved in 30 cc. of water and a dilute aqueous solution containing 0.56 g. of potassium hydroxide added. The solution is frozen and the ice sublimed from the frozen mass under high vacuum to obtain the desired potassium salt of O-diazoacetyl-(dl)-serine as a white powder.

1.7 g. of O-diazoacetyl-(l)-serine is dissolved in 30 cc. of water and an aqueous solution containing 0.37 g. of calcium hydroxide added. The solution is frozen and the ice sublimed from the frozen mass under high vacuum to obtain the desired calcium salt of O-diazoacetyl-(l)-serine as a white powder.

The starting materials for the process, namely the O-glycylserine compounds, can be prepared as previously described. A more detailed description is given in the following example:

Example 9

10.4 g. of ethyl chlorocarbonate is added to a well-stirred solution of 20 g. of carbobenzoxyglycine and 10.6 g. of triethylamine in 200 cc. of anhydrous ethyl acetate keeping the temperature at −5° C. The reaction mixture is stirred for thirty minutes at −5° C. which causes the separation of a white crystalline mass. A solution of 23 g. of N-carbobenzoxy-(l)-serine and 10.6 g. of triethylamine in 200 cc. of dry ethyl acetate is added to the reaction mixture and the mixture allowed to warm to room temperature. The reaction mixture is then heated at 40° C. for two hours and then allowed to stand for twelve to sixteen hours at 25° C. The reaction mixture is extracted three times with water and the aqueous solution acidified with concentrated hydrochloric acid. The precipitated oil is extracted with ethyl acetate and the ethyl acetate solution dried. The drying agent is removed by filtration and the solvent removed from the filtrate by distillation in vacuo. The residual syrup so obtained solidifies upon standing to a hard glass. This product is O-(N-carbobenzoxyglycyl)-N-carbobenzoxy-(l)-serine.

200 mg. of palladium black catalyst is added to a solution consisting of 4 g. of O-(N-carbobenzoxyglycyl)-N-carbobenzoxy-(l)-serine and 8 cc. of 1 N hydrochloric acid in 100 cc. of 50% aqueous ethanol. The mixture is shaken at room temperature for about two hours with hydrogen under a pressure of 30 pounds per square inch. The catalyst is removed by filtration and the filtrate concentrated in vacuo to a small volume. The addition of absolute ethanol to the residue causes white crystals of the desired O - glycyl - (l) - serine monohydrochloride to separate. The product is collected and dried; M.P. 161.5° C. (dec.); $[\alpha]_D^{28°} = +10.36$ (5% in water).

Azaserine, O-diazoacetyl-(l)-serine, can also be produced by a microbiological process as described in copending application Serial No. 456,338, filed September 15, 1954.

What we claim is:

1. A compound having the formula,

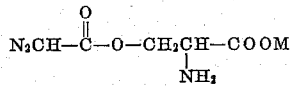

where M is a member of the class consisting of H, alkali metal, and one equivalent of alkaline earth metal.

2. O-diazoacetylserine.

3. O-diazoacetyl-(l)-serine.

4. O-diazoacetyl-(dl)-serine.

5. Process for the production of an O-diazoacetyl-serine which comprises reacting an acid addition salt of an O-glycyl serine with a diazotizing agent at a temperature below about 30° C. and at a pH between 3 and 6.

6. Process for the production of an O-diazoacetyl-serine which comprises reacting an acid addition salt of an O-glycyl serine with nitrous acid at a temperature below about 30° C. and at a pH between 4.0 and 5.5.

7. Process according to claim 6 wherein the nitrous acid is generated in situ by the interaction of a mineral acid and an inorganic nitrite.

8. Process for the production of O-diazoacetyl-(l)-serine which comprises reacting O-glycyl-(l)-serine monohydrochloride with nitrous acid at a temperature below about 30° C. and at a pH between 4.0 and 5.5.

9. Process for the production of O-diazoacetyl-(l)-serine which comprises reacting an acid addition salt of O-glycyl-(l)-serine with an alkyl nitrite at a temperature below about 30° C. and at a pH between 4.0 and 5.5.

10. Process for the production of O-diazoacetyl-(l)-serine which comprises reacting an acid addition salt of O-glycyl-(l)-serine with a nitrosyl compound at a temperature below about 30° C. and at a pH between 4.0 and 5.5.

11. Process for the production of O-diazoacetyl-(dl)-serine which comprises reacting O-glycyl-(dl)-serine monohydrocloride with nitrous acid at a temperature below about 30° C. and at a pH between 4.0 and 5.5

References Cited in the file of this patent

FOREIGN PATENTS

| 1,088,177 | France | Sept. 8, 1954 |
| 1,088,178 | France | Sept. 8, 1954 |